(12) United States Patent
Park

(10) Patent No.: US 12,319,120 B2
(45) Date of Patent: Jun. 3, 2025

(54) DAMPER OF AIR VENT FOR VEHICLE

(71) Applicant: ECOPLASTIC CORPORATION, Gyeongju-si (KR)

(72) Inventor: Hae Ju Park, Gyeongju-si (KR)

(73) Assignee: ECOPLASTIC CORPORATION, Gyeongju-si (KR)

( * ) Notice: Subject to any disclaimer, the term of this patent is extended or adjusted under 35 U.S.C. 154(b) by 387 days.

(21) Appl. No.: 17/853,021

(22) Filed: Jun. 29, 2022

(65) Prior Publication Data

US 2023/0031783 A1  Feb. 2, 2023

(30) Foreign Application Priority Data

Jul. 28, 2021  (KR) ......................... 10-2021-0098937

(51) Int. Cl.
*B60H 1/00* (2006.01)

(52) U.S. Cl.
CPC .................. *B60H 1/00664* (2013.01); *B60H 2001/00707* (2013.01)

(58) Field of Classification Search
CPC ...... B60H 1/00664; B60H 2001/00707; B60H 2001/00714
See application file for complete search history.

(56) References Cited

U.S. PATENT DOCUMENTS

2016/0176267 A1\* 6/2016 Shin .................... B60H 1/3414
454/155
2016/0263967 A1  9/2016 Schaake

FOREIGN PATENT DOCUMENTS

| EP | 0633153 | A1 * | 1/1995 | |
| FR | 2669277 | A1 * | 5/1992 | ......... B60H 1/00678 |
| JP | 07019857 | | 5/1995 | |
| JP | 2008105562 | A | 5/2008 | |
| KR | 20060033940 | A | 4/2006 | |
| KR | 101428936 | B1 | 8/2014 | |

OTHER PUBLICATIONS

Tauber, EP0633153 and translation (Year: 1995).*
Michel, FR2669277 and translation (Year: 1992).*
Office Action issued in connection with Indian Patent Application No. 202244037407 dated Feb. 7, 2023.
KR Office Action for corresponding KR application No. 10-2021-0098937, issued May 25, 2023, pp. 1-5.

\* cited by examiner

*Primary Examiner* — Steven S Anderson, II
(74) *Attorney, Agent, or Firm* — Tarolli, Sundheim, Covell & Tummino LLP

(57) ABSTRACT

Provided is a damper of an air vent for a vehicle, in which an operating member and a pad member are assembled with a structure in which a coupling protrusion of the operating member is inserted into a coupling hole of the pad member. As dimensions of the damper become accurate, a gap is not formed, thereby preventing air leakage. Moreover, due to no need for overlap of the pad member, the operating force of the damper is reduced and becomes uniform, and friction noise of the pad member in operation is prevented. Furthermore, an assembly method is simple, facilitating automation and expecting productivity improvement.

6 Claims, 5 Drawing Sheets

DAMPER OF AIR VENT FOR VEHICLE

CROSS REFERENCE TO RELATED APPLICATION

The present application claims priority to Korean Patent Application No. 10-2021-0098937, filed Jul. 28, 2021, the entire contents of which is incorporated herein for all purposes by this reference.

BACKGROUND OF THE INVENTION

Field of the Invention

The present invention relates to a damper of an air vent for a vehicle, and more particularly, to a damper of an air vent for a vehicle, which is installed inside an air vent housing to adjust an air volume discharged into the interior.

Description of the Related Art

A vehicle is provided with an air conditioning device for cooling/heating the interior thereof. The air conditioning device includes an air conditioning unit provided with an evaporator and a heater therein to form cool air and warm air, an air vent installed in the interior of the vehicle, and a duct for connecting the air conditioning unit to the air vent.

Thus, the external air is cooled or heated by exchanging heat with the evaporator or the heater while passing through the air conditioning unit, and moves inside the duct and is discharged into the interior space of the vehicle through the air vent to perform cooling or heating.

The air vent includes a housing 1 connected to the duct, a damper 2 pivotably installed inside the housing 1, and a vent grill (not shown) installed in a front surface of the housing 1, as shown in FIG. 1.

The vent grill, which is one of the internal (interior) components of the vehicle, includes multiple horizontal and vertical blades and has an air volume adjustment knob installed to adjust directions thereof, thus providing an air volume adjustment function.

The damper 2 is connected to an air volume control knob of a dial type provided in the front surface of the housing 1 through an interlocking mechanism to control an open cross-sectional area of the housing 1 by pivoting around a hinge portion 2aa, thereby controlling the air volume.

As shown in FIG. 2, the damper 2 includes an operating member 2a and a pad member 2b. The operating member 2a is a plastic injection mold, and the pad member 2b is a part of a rubber material.

The hinge portion 2aa is formed in both side portions of the operating member 2a to serve as a center of pivoting. In the operating member 2a, a coupling groove 2ab is formed along a circumferential surface. Thus, the pad member 2b inside which a rectangular coupling hole 2ba is formed is forcedly inserted into the coupling groove 2ab and thus is coupled to the operating member 2a.

Two hooks 2ac are formed in a side end portion of the operating member 2a, and one hook 2ac is formed in the other side end portion of the operating member 2a, and hook holes 2bc corresponding thereto are formed in the pad member 2b, thereby preventing mis-assembly of the pad member 2b.

A plurality of recessed grooves 2bb may be formed to prevent whistle noise in an end portion of the pad member 2b.

FIG. 3 is a cross-sectional view cut along line A-A of FIG. 1, showing a closed state of the damper 2. As is shown, a locking protrusion 1a is formed to protrude on an inner surface of the housing 1. As the damper 2 pivots (in a direction of an arrow A) to cause the pad member 2b to closely contact the locking protrusion 1a by being locked by the locking protrusion 1a, thereby cutting off a flow path.

However, as the pad member 2b is assembled to the coupling groove 2ab of the operating member 2a in a forced insertion manner, dimensions of the damper 2 are non-uniform (a length of the pad member 2b protruding from the coupling groove 2ab is not constant) due to a large assembly variation, such that the amount of overlap with respect to the inner surface of the housing 1 or the locking protrusion 1a is non-uniform, and thus the operating force of the damper 2 is non-uniform, and for a short length of the pad member 2b, a gap may be formed between the pad member 2b and the locking protrusion 1a, causing air leakage.

Moreover, the plurality of recessed grooves 2bb are formed in the end portion of the pad member 2b to prevent whistle noise, but air leakage also occurs due to the recessed grooves 2bb.

Therefore, the amount of overlap of the pad member 2b may be designed large to prevent occurrence of air leakage (the amount of overlap=1.5 mm-2.0 mm), and due to such an excessive amount of overlap, a frictional force also increases with increase in the amount of contact between the pad member 2b and the housing 1, resulting in unnecessary increase in the operating force of the damper 2 and causing friction noise (so-called 'sweep noise') due to sweeping of the pad member 2b on the inner surface of the housing 1.

Moreover, to prevent mis-assembly, the hook 2ac is formed in the operating member 2a, and a side wall (support wall) portion of the coupling groove 2ab is removed from a hook 2ac-formed portion, failing to support a side surface of the pad member 2b as shown in FIG. 4, such that when the pad member 2b closely contacts the locking protrusion 1a, the pad member 2b is deformed in a direction without the support wall, forming a gap and thus causing air leakage.

In addition, as a peripheral portion of the coupling hole 2ba of the pad member 2b has to be forcedly inserted into the coupling groove 2ab of the operating member 2a, merely relying on a manual operation of an operator and degrading operation efficiency.

Documents of Related Art (Patent Document 1) Korean Patent Registration Gazette No. 10-1428936 (Aug. 8, 2014)

SUMMARY OF THE INVENTION

The present invention has been provided to solve the foregoing problems, and aims to provide a damper of an air vent for a vehicle in which an assembly variation of a pad member is reduced to make dimensions of the damper uniform, prevent generation of a gap and thus occurrence of air leakage, and improve assembly efficiency.

A damper of an air vent for a vehicle according to the present invention includes an operating member installed to pivot inside a housing of the air vent and a pad member provided along a circumference of an end portion of the operating member and locked by a locking protrusion formed on an inner surface of the housing to prevent a flow path, in which a support wall is formed in an end portion of a body plate of the operating member and a plurality of coupling protrusions are formed on the support wall, a coupling portion in a shape that is the same as a shape of the support wall is formed in the pad member, and a coupling hole one-to-one corresponding to the coupling protrusion is formed in the coupling protrusion, and the pad member is mounted on the operating member with a structure in which the coupling protrusion is insertedly coupled to the coupling hole.

The pad member may include a reinforcing portion having an increased thickness on an outer side of the coupling portion and a contact end formed to protrude on an outer side of the reinforcing portion, and the contact end may include a first blocking portion and a second blocking portion respectively closely contacting a first contact surface and a second contact surface formed on the locking protrusion of the housing.

The first blocking portion and the second blocking portion may be continuously formed, and an angle between the first blocking portion and the second blocking portion may be equal to an angle between the first contact surface and the second contact surface of the locking protrusion.

A gap may exist between an end portion surface of the contact end and the inner surface of the housing.

A gap may exist between an end portion surface of the reinforcing portion and an end portion surface of the locking protrusion.

A protruding protrusion may be formed on an end portion-side outer circumferential surface of the coupling protrusion such that a peripheral portion of the coupling hole of a pad member is locked.

The protruding protrusion may be formed on the end portion-side outer circumferential surface of the coupling protrusion, and the protruding protrusion may be formed on a semicircular portion facing an outer side of the pad member out of the outer circumferential surface of the coupling protrusion.

A recessed groove may be formed between the reinforcing portion and the contact end, and a reinforcing portion-side surface of the recessed groove may form a surface that is perpendicular to a longitudinal direction of the coupling portion and a contact end-side surface of the recessed groove may be formed as an inclined surface.

DETAILED DESCRIPTION OF THE INVENTION

Figure 1:
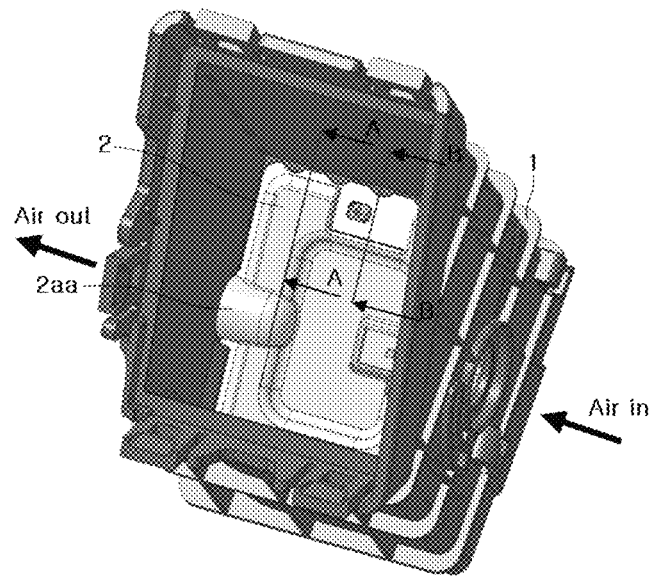
FIG. 1 is a perspective view of an air vent to which a damper according to prior art is applied.
Figure 2:
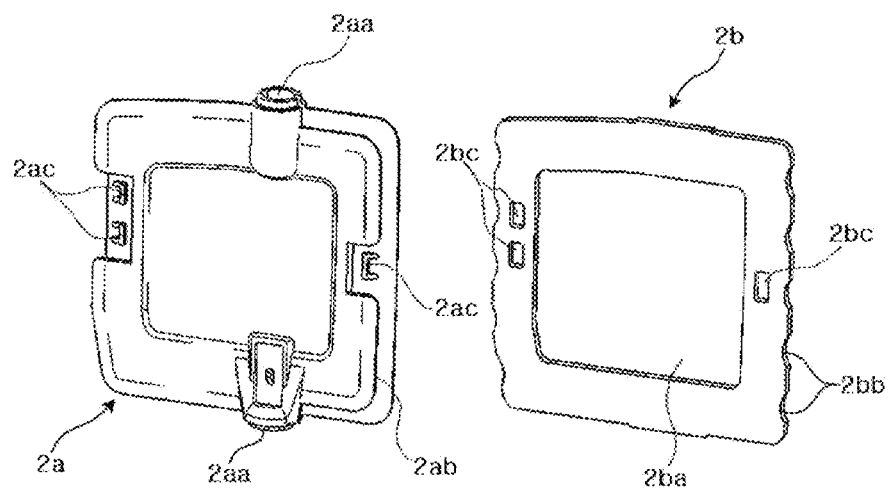
FIG. 2 is an exploded perspective view of a damper according to prior art.
Figure 3:
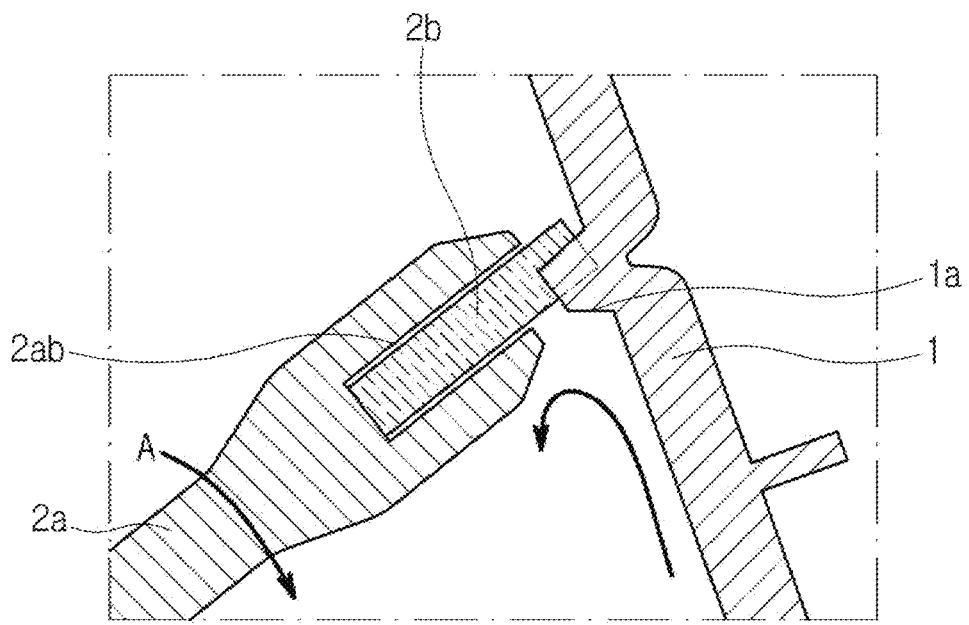
FIG. 3 is a cross-sectional view cut along line A-A of FIG. 1.
Figure 4:
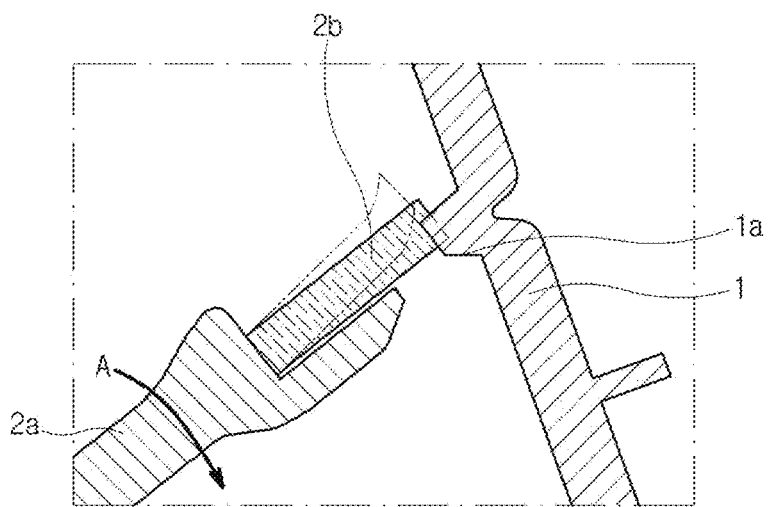
FIG. 4 is a cross-sectional view cut along line B-B of FIG. 1.

Various changes may be made to the present invention and the present invention may have various embodiments which will be illustrated in the drawings and described in detail. However, such a description is not construed as limited to specified embodiments, and include all changes, equivalents, or substitutes included in the spirit and technical scope of the present invention. The thickness of the lines or the size of components shown in the accompanying drawings may be exaggerated for clarity and convenience of description.

Further, the terminologies to be described below are defined in consideration of functions in the present disclosure and may vary depending on a user's or operator's intention or precedent. Therefore, definition of the terms should be made based on the overall disclosure.

Hereinafter, various embodiments of the present invention will be disclosed with reference to the accompanying drawings.

Figure 5:
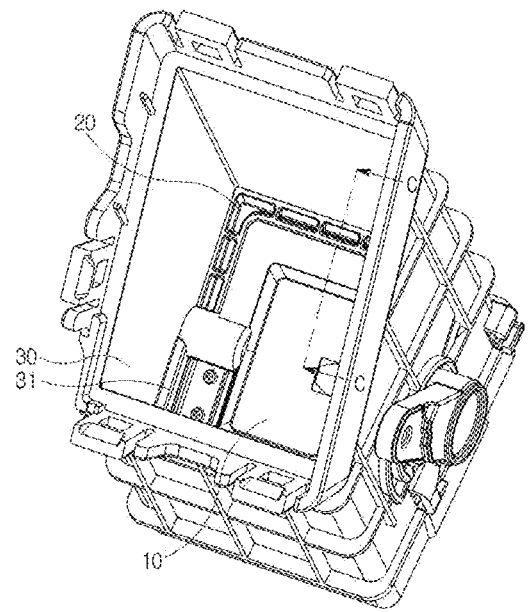
FIG. 5 is a perspective view of an air vent to which a damper according to the present invention is applied.
Figure 6:
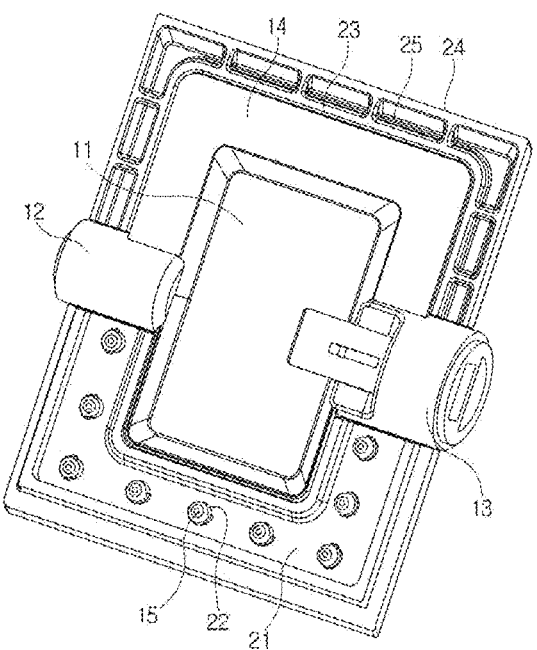
FIG. 6 is a perspective view of a damper according to the present invention.
Figure 7:
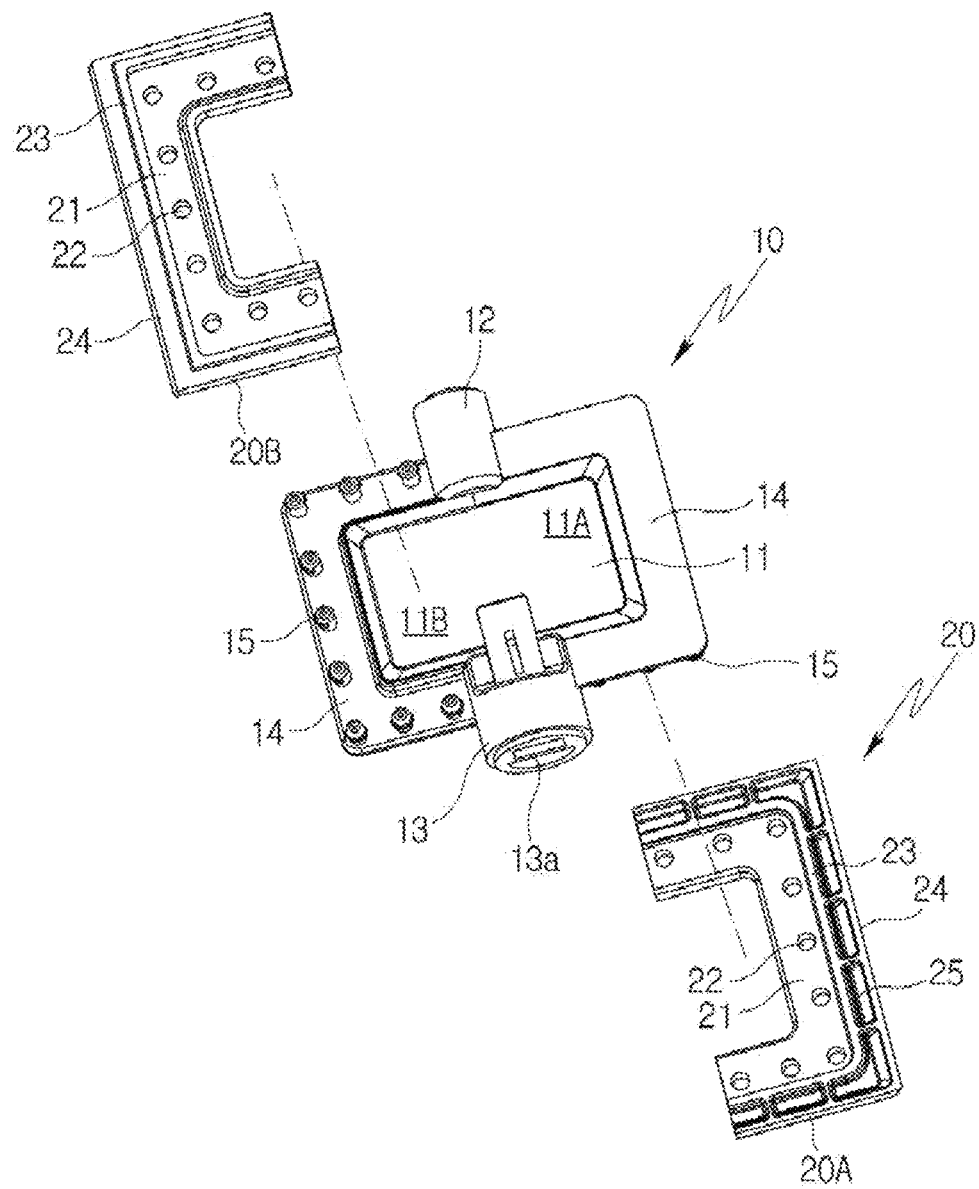
FIG. 7 is an exploded perspective view of a damper according to the present invention.

As shown in FIGS. 5 to 7, a damper of an air vent for a vehicle according to the present invention may be installed to pivot inside a housing 30 and may include an operating member 10 and a pad member 20.

The operating member 10, which is a plastic injection mold, may include a body plate 11 globally in the shape of a rectangle, and hinge portions 12 and 13 formed in both side portions of the body plate 11.

The hinge portions 12 and 13 may be formed in a cylindrical shape so as to be inserted into a hinge hole formed in the housing 30 and to rotate, and an installation hole 13a is formed in the one-side hinge portion 13 to allow an interlocking mechanism for interlocking the operating member 10 to an air volume control knob to be installed.

The body plate 11 may globally have the shape of a rectangle, and a circumferential portion thereof is formed with a step with respect to an inner portion thereof. The circumferential portion formed with the step will be referred to as a support wall 14. The pad member 20 may be assembled to the support wall 14.

A plurality of coupling protrusions 15 may be formed at specific intervals on the support wall 14. The coupling protrusion 15 may be formed to protrude perpendicularly to the support wall 14, and a protruding protrusion 15a may be formed to protrude outwardly in a radial direction on an end portion-side outer circumferential surface of the coupling protrusion 15 such that the pad member 20 in a coupled state is locked so as not to leave the coupling protrusion 15.

The protruding protrusion 15a is formed in a semicircular portion facing the outer portion of the operating member 10 on the outer circumferential surface of the coupling protrusion 15. That is, the protruding protrusion 15a may be formed in a semicircular shape. Thus, as the degree to which a diameter of the coupling protrusion 15 increases is halved by the protruding protrusion 15a, it is easy to insert and couple the coupling protrusion 15 into and to the coupling hole 22.

As such, coupling between the coupling protrusion 15 and the coupling hole 22 may be easy to perform, and the protruding protrusion 15a may effectively suppress leaving of the pad member 20. When the pad member 20 is separated from the operating member 10, an outer end portion-side portion, i.e., a contact end 24 is generally tilted in the opposite direction to the support wall 14 for separation, and the protruding protrusion 15a is formed to protrude outwardly from the operating member 10 to suppress a behavior of tilting the contact end 24 and thus to suppress separation of the pad member 20.

The body plate 11 may have a shape such that both side portions 11A and 11B are rotated by 180° with respect to each other around a central axis line connecting the both-side hinge portions 12 and 13. That is, the support wall 14 formed in a circumferential portion in the both side portions 11A and 11B with respect to the central axis line of the hinge portions 12 and 13 has a step in opposite directions.

Likewise, protruding directions of the coupling protrusions 15 formed on the support wall 14 of the both side portions 11A and 11B with respect to the central axis line of the hinge portions 12 and 13 may also be opposite to each other.

The pad member 20 may be formed in the shape of c so as to be mounted across end portions and both side portions of the both side portions 11A and 11B of the body plate 11 (except for the hinge portions 12 and 13).

The pad member 20 may include an inner coupling portion 21, a reinforcing portion 23 formed on an outer side of the coupling portion 21, and a contact end 24 formed on an outer side of the reinforcing portion 23, i.e., in an opposite side of the coupling portion 21.

The coupling portion 21 may be formed in the same shape and size as the support wall 14 of the one side portion 11A or 11B of the body plate 11 to closely contact the inner surface of the support wall 14 (a surface where the coupling protrusion 15 is formed).

A plurality of coupling holes 22 may be formed at specific intervals in the coupling portion 21. The protruding protrusion 15 and the coupling hole 22 may one-to-one correspond to each other due to the same numbers and intervals thereof. Thus, the pad member 20 may be assembled to the operating member 10 with a structure in which the coupling protrusion 15 is insertedly coupled to the coupling hole 22, as shown in FIG. 8.

The reinforcing portion 23 may be formed on an outer end portion of the coupling portion 21 and formed with a thickness greater than that of the coupling portion 21 to reinforce the rigidity of the pad member 20. A side portion of the reinforcing portion 23 may closely contact an end portion corner of the support wall 14 in a form surrounding the end portion corner, thus adding the rigidity of the assembled state of the pad member 20 and preventing the entire pad member 20 from being tilted in the opposite direction to a damper pivot direction (a direction of an arrow A) when the contact end 24 is locked by the locking protrusion 31 of the housing 30 in closing of the damper.

Figure 8:
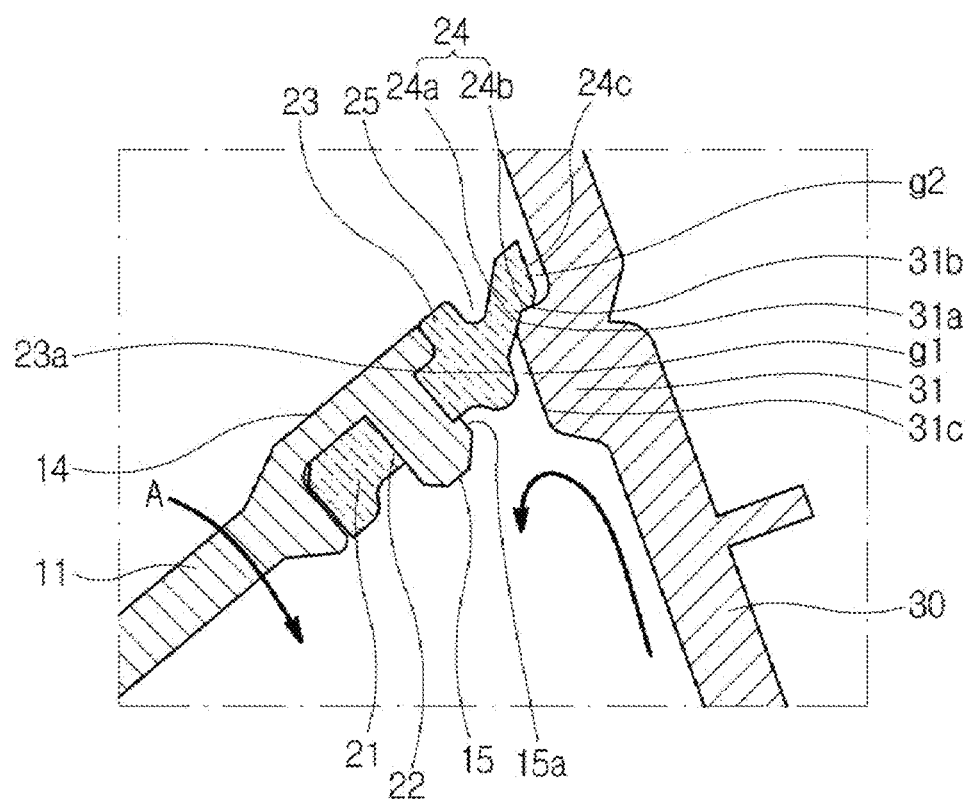
FIG. 8 is a cross-sectional view cut along line C-C of FIG. 5.

The contact end 24 may be formed to protrude in the opposite direction to the coupling portion 21 on the reinforcing portion 23, and a first blocking portion 24a and a second blocking portion 24b may be formed in a portion corresponding to the locking protrusion 31 of the housing 30, as shown in FIG. 8.

The first blocking portion 24a may be formed as an inclined surface having the same angle as a first contact surface 31a of the locking protrusion, and the second blocking portion 24b may be formed continuously to the first blocking portion 24a to have the same angle as an angle of a second contact surface 31b that is a side surface of the locking protrusion 31 with respect to the first contact surface 31a. That is, an angle between the first blocking portion 24a and the second blocking portion 24b of the contact end 24 may be equal to an angle between the first contact surface 31a and the second contact surface 31b of the locking protrusion 31. Thus, when the contact end 24 is locked by the locking protrusion 31, the first blocking portion 24a may contact the first contact surface 31a and the second blocking portion 24b may contact the second contact surface 31b, thereby enabling the contact end 24 and the locking protrusion 31 to closely contact each other accurately without a gap therebetween.

Meanwhile, to prevent the elasticity of the contact end from being excessively reduced due to the excessive reinforcing effect of the reinforcing portion 23, a recessed groove 25 in an approximately right-triangular shape may be formed between the reinforcing portion 23 and the contact end 24.

A surface of the recessed groove 25 in a side of the reinforcing portion 23 may form a surface that is approximately perpendicular to the longitudinal direction of the coupling portion 21, and a surface of the recessed groove 25 in a side of the contact end 24 may be formed as an inclined surface corresponding to a sloped plane of a right triangle. With such a shape of the recessed groove 25, the contact end 24, when contacting the locking protrusion 31, may have appropriate elasticity in the opposite direction to the damper operation direction (the arrow A), thus reducing contact shock and contact noise.

The reinforcing portion 23 may be formed to such a length that an end portion surface 23a (an end surface of an opposite portion to a portion where the recessed groove 25 is formed) does not contact the locking protrusion 31 of the housing 30. That is, a gap g1 may exist between the end portion surface 23a of the reinforcing portion 23 and an end portion surface 31c of the locking protrusion 31.

In addition, an end portion surface 24c of the contact end 24 is formed to such a length as not to overlap the inner surface of the housing 30. That is, the end portion surface 24c of the contact end 24 may be formed to such a length as not to overlap the inner surface of the housing 30, and thus a gap g2 may exist between the end portion surface 24c and the inner surface of the housing 30.

The pad member 20 may be manufactured according to one specification and may be applied to both the both side portions 11A and 11B of the body plate 11 of the operating member 10. That is, in FIG. 7, two pad members 20A and 20B respectively mounted on the both side portions 11A and 11B of the body plate 11 are parts according to the same specifications, and may be mounted in opposite directions when mounted on the both side portions 11A and 11B of the body plate 11.

This is natural in terms of an operating structure of the damper, and this is because in both side portions with respect to a central axis of pivoting of the damper, contact surfaces of the contact end 24 of the pad member 20 contacting the locking protrusion 31 formed on the inner surface of the housing 30 are oriented in opposite directions to each other.

Hereinbelow, working effects of the present invention will be described.

When the user manipulates the air volume control knob, the operating member 10 may pivot around the hinge portions 12 and 13 (in the direction of the arrow A of FIG. 8) through the interlocking mechanism to control an open area inside the housing 30, thereby controlling an air volume.

FIG. 8 shows a completely closed state of the damper in which the contact end 24 of the pad member 20 provided in the end portion of the operating member 10 closely contacts the locking protrusion 31 of the housing 30, and thus the air may not be discharged from the duct to the interior space of the vehicle.

In the damper of the air vent according to the present invention, the operating member 10 and the pad member 20 are assembled to each other by coupling between the plurality of coupling protrusions 15 and the plurality of coupling holes 22, such that relative positions of the operating member 10 and the pad member 20 are identical at all times.

Thus, when assembly of the operating member 10 and the pad member 20 is completed, that is, assembly of the damper is completed, a protruding length of the pad member 20 from the end portion of the operating member 10 may be constant and uniform.

Therefore, the contact end 24 of the pad member 20 may closely contact the locking protrusion 31 of the housing exactly at all times when the damper is closed, thereby preventing occurrence of air leakage. That is, by preventing a gap from being generated because the pad member 20 does not contact the locking protrusion 31 due to a short length thereof, thereby preventing occurrence of air leakage.

In particular, the first blocking portion 24a and the second blocking portion 24b of the contact end 24 closely contact a corner portion including the first contact surface 31a and the second contact surface 31b of the locking protrusion 31 of the housing 30 with a structure surrounding the corner portion, making generation of a gap between the contact end 24 and the locking protrusion 31 difficult and thus certainly preventing air leakage.

As the angle between the first blocking portion 24a and the second blocking portion 24b of the contact end 24 and the angle between the first contact surface 31a and the second contact surface 31b of the locking protrusion 31 are equal to each other, in spite of a fine error in a position of the contact end 24 with respect to the locking protrusion 31, any one part of the first blocking portion 24a and the first contact surface 31a or the second blocking portion 24b and the second contact surface 31b may come into contact with each other when the damper is closed, thereby preventing generation of a gap and thus certainly preventing air leakage.

As the air leakage blocking performance is improved as described above, the contact end 24 does not need to overlap the inner surface of the housing 30, such that the gap g2 may be provided between the end portion surface 24c of the contact end 24 and the inner surface of the housing 30.

Therefore, in a blocking (close state) operation of the damper, friction noise (sweep noise) may be prevented from being generated by sliding of the pad member 20 in contact with the housing 30.

Moreover, as the pad member 20 does not overlap the housing 30, the operating force of the damper may be reduced and maintained uniform at all times.

Furthermore, in the damper of the air vent according to the present invention, the coupling portion 21 of the pad member 20 may be formed in the opposite direction to the operation direction of the damper and the coupling portion 21 may be installed in close contact with the entire support wall 14, and there is no part where even a partial section is to be removed in the support wall 14, thus preventing the pad member 20 from being deformed in the opposite direction to the pivoting direction of the damper when the damper is closed.

Thus, when the end portion (the contact end 24) of the pad member 20 contacts the locking protrusion 31 of the housing 30, a gap is not generated between the pad member 20 and the locking protrusion 31 of the housing 30 due to partial deformation of the pad member 20, thus preventing air leakage.

In addition, as the gap g1 exists between the end portion surface 23a of the reinforcing portion 23 and the end portion surface 31c of the locking protrusion 31, the reinforcing portion 23 is not first locked by the locking protrusion 31 when the damper is closed, allowing the first blocking portion 24a and the second blocking portion 24b of the contact end 24 to closely contact the first contact surface 31a and the second contact surface 31b of the locking protrusion 31 smoothly.

Meanwhile, the operating member 10 and the pad member 20 according to the present invention may be assembled to each other by coupling of the coupling protrusion 15 and the coupling hole 22. That is, by linearly moving one of the operating member 10 and the pad member 20 to the other while fixing the position of the other, the assembly may be completed, making the assembly method very simple.

Accordingly, unlike a conventional case where the pad member is forcedly inserted into the operating member manually, an assembly device may be manufactured using a machine of a simple structure including a jig and a linear movement means, whereby assembly automation is easy to achieve and assembly efficiency and product productivity may be improved in case of automation.

According to the present invention as described above, the pad member is coupled to the coupling protrusion of the operating member to reduce the assembly variation, thus making dimensions of the damper accurate and uniform and thus preventing air leakage by avoiding generation of a gap between the pad member and the housing.

Moreover, the contact end of the pad member includes the first blocking portion and the second blocking portion that are bent at a predetermined angle to improve air leakage blocking performance, thereby avoiding a need to cause the pad member to overlap the inner side of the housing and thus preventing the pad member from being rubbed against the housing, thus to reduce and equalize the operating force of the damper and prevent friction noise.

In addition, as a partial section of the support wall is not removed from the operating member, when the pad member closely contacts the locking protrusion, deformation may not occur, and thus a gap is not formed, thereby preventing the occurrence of air leakage.

Furthermore, the operating member may be assembled to the pad member with a simple operation of linearly moving the pad member in an axial direction of the coupling protrusion formed on the support wall of the operating member, thereby facilitating automation of an assembly process and thus increasing efficiency and productivity of an assembly operation.

As described, the present invention has been shown and described in connection with the embodiments, it will be apparent to those of ordinary skill in the art that modifications and variations can be made without departing from the spirit and scope of the embodiments as defined by the appended claims Therefore, the true technical scope of the present disclosure should be defined by the appended claims.

DESCRIPTION OF REFERENCE NUMERALS

10: OPERATING MEMBER
11: BODY PLATE
12, 13: HINGE PORTION
14: SUPPORT WALL
15: COUPLING PROTRUSION
15A: PROTRUDING PROTRUSION
20: PAD MEMBER
21: COUPLING PORTION
22: COUPLING HOLE
23: REINFORCING PORTION
24: CONTACT END
24A: FIRST BLOCKING PORTION
24B: SECOND BLOCKING PORTION

25: RECESSED GROOVE
30: HOUSING
31: LOCKING PROTRUSION
31A: FIRST CONTACT SURFACE
31B: SECOND CONTACT SURFACE

What is claimed is:

1. A damper of an air vent for a vehicle, the damper comprising:
    an operating member installed to pivot inside a housing of the air vent; and
    a pad member provided along a circumference of an end portion of the operating member and locked by a locking protrusion formed on an inner surface of the housing to prevent a flow path, wherein a support wall is formed in an end portion of a body plate of the operating member and a plurality of coupling protrusions are formed on the support wall,
    a coupling portion in a shape that is the same as a shape of the support wall is formed in the pad member, and a coupling hole one-to-one corresponding to the coupling protrusion is formed in the coupling protrusion, and
    the pad member is mounted on the operating member with a structure in which the coupling protrusion is insertedly coupled to the coupling hole,
    wherein the pad member comprises a reinforcing portion having a thickness greater than that of the coupling portion on an outer side of the coupling portion and a contact end formed to protrude on an outer side of the reinforcing portion,
    wherein the contact end comprises a first blocking portion and a second blocking portion respectively closely contacting a first contact surface and a second contact surface formed on the locking protrusion of the housing,
    wherein a recessed groove is formed between the reinforcing portion and the contact end, and a reinforcing portion-side surface of the recessed groove forms a surface that is perpendicular to a longitudinal direction of the coupling portion and a contact end-side surface of the recessed groove is formed as an inclined surface,
    wherein the first blocking portion and the second blocking portion are formed on one side of the contact end, and the recessed groove is formed on the other side of the contact end.

2. The damper of claim 1, wherein the first blocking portion and the second blocking portion are continuously formed, and an angle between the first blocking portion and the second blocking portion is equal to an angle between the first contact surface and the second contact surface of the locking protrusion.

3. The damper of claim 1, wherein a gap exists between an end portion surface of the contact end and the inner surface of the housing.

4. The damper of claim 1, wherein a gap exists between an end portion surface of the reinforcing portion and an end portion surface of the locking protrusion.

5. The damper of claim 1, wherein a protruding protrusion is formed on an end portion-side outer circumferential surface of the coupling protrusion such that a peripheral portion of the coupling hole of the pad member is locked.

6. The damper of claim 5, the protruding protrusion is formed on a semicircular portion facing an outer side of the pad member out of the outer circumferential surface of the coupling protrusion.

* * * * *